(12) United States Patent
Condurache et al.

(10) Patent No.: US 12,705,487 B2
(45) Date of Patent: Aug. 11, 2026

(54) METHOD FOR SIMPLIFYING AN ARTIFICIAL NEURAL NETWORK

(71) Applicant: Robert Bosch GmbH, Stuttgart (DE)

(72) Inventors: Alexandru Paul Condurache, Renningen (DE); Jens Eric Markus Mehnert, Malmsheim (DE); Paul Wimmer, Filderstadt-Bonlanden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1006 days.

(21) Appl. No.: 17/839,664

(22) Filed: Jun. 14, 2022

(65) Prior Publication Data

US 2022/0405600 A1 Dec. 22, 2022

(30) Foreign Application Priority Data

Jun. 17, 2021 (DE) ..................... 10 2021 206 183.4

(51) Int. Cl.
*G06N 3/082* (2023.01)
*G06F 18/214* (2023.01)

(52) U.S. Cl.
CPC ......... *G06N 3/082* (2013.01); *G06F 18/2148* (2023.01)

(58) Field of Classification Search
None
See application file for complete search history.

(56) References Cited

U.S. PATENT DOCUMENTS

2017/0017212 A1* 1/2017 Collins .................. G06N 20/00
2018/0114114 A1* 4/2018 Molchanov ............ G06N 3/045
2019/0303750 A1* 10/2019 Kumar .................. G06F 7/5443
2021/0110268 A1* 4/2021 Azarian Yazdi ......... G06N 3/04
2022/0108180 A1* 4/2022 Cho ....................... G06N 3/045
2022/0261648 A1* 8/2022 Bhalgat .................. G06N 3/084
2022/0318412 A1* 10/2022 Guo ........................ G06F 17/18

FOREIGN PATENT DOCUMENTS

CN 112016672 A * 12/2020 ....... G06F 18/23213
CN 115210657 A * 10/2022 ........... G05B 13/042
DE 102019205079 A1 12/2019

* cited by examiner

*Primary Examiner* — Mandrita Brahmachari
(74) *Attorney, Agent, or Firm* — NORTON ROSE FULBRIGHT US LLP

(57) ABSTRACT

A method for simplifying an artificial neural network (ANN) whose behavior is characterized by trainable parameters. In the method: a first assessment criterion is provided, which maps simplified configurations of the ANN on predictions for the performance of the ANN in the particular configuration; a second assessment criterion is provided, which also maps simplified configurations of the ANN on predictions for the performance of the ANN in the particular configuration, this second assessment criterion being at least partially complementary to the first assessment criterion; a simplified configuration of the ANN is optimized with the goal that this simplified configuration is mapped both by the first assessment criterion and also by the second assessment criterion, and/or by an overall assessment criterion resulting from a combination of both assessment criteria, on the best possible prediction for the performance of the ANN.

18 Claims, 5 Drawing Sheets

200
provide ANN
210
1
ascertain simplified configuration of ANN
220
100
1a
transfer ANN into the simplified configuration
230
1 (1a)
sensor(s)
9
train ANN
240
1* (1a)
supply measurement data to ANN
250
8
8
map measurement data onto outputs
260
1* (1a)
10
generate activation signal
270
11
activate vehicle and/or system
280
50,60,70,80

METHOD FOR SIMPLIFYING AN ARTIFICIAL NEURAL NETWORK

FIELD

The present invention relates to the simplification of artificial neural networks, which may be used, for example, as image classifiers.

BACKGROUND INFORMATION

Artificial neural networks, ANN, map inputs, for example images, with the aid of a processing chain, which is characterized by a plurality of parameters and may be organized in layers, for example, on outputs relevant for the particular application. For example, for an input image, an image classifier supplies an assignment to one or multiple classes of a predefined classification as an output. An ANN is trained in that training data are supplied to it and the parameters of the processing chain are optimized in such a way that the supplied outputs correspond as well as possible to previously known setpoint outputs associated with the particular training data.

The training is typically very computing intensive and accordingly requires a large amount of energy. To reduce the computing effort, setting a part of the parameters to zero and not training them further is known under the name "pruning". The tendency toward "overfitting" is also suppressed at the same time in this way, which corresponds to "learning by rote" of the training data in place of understanding the knowledge contained in the training data. Furthermore, deactivating individual processing units at the runtime (inference) of the ANN is described in German Patent Application No. DE 10 2019 205 079 A1 to save energy and heat generation. Furthermore, the memory expenditure for the network during and after the training is also reduced.

SUMMARY

Within the scope of the present invention, a method is provided for simplifying an artificial neural network, ANN. The behavior of the ANN is characterized by trainable parameters. The parameters may in particular include weights, for example, using which inputs, which are supplied to a neuron or another processing unit of the ANN, are summed in weighted form. This sum forms the activation of the neuron or the processing unit. The output of the neuron or the processing unit is formed from it by application of a nonlinearity, for example, the ReLU function.

A simplified configuration of the ANN is understood as a configuration which differs from the original ANN in that

- parameters from a pruning parameter set, which is a proper subset of the trainable parameters, are each set to zero or a constant value and/or are fixed during the training of the ANN, and/or
- neurons or other processing units from a pruning unit set, which is a proper subset of the neurons or other processing units of the ANN, are deactivated.

In accordance with an example embodiment of the present invention, within the scope of the method, at least one first and one second assessment criterion are provided. These assessment criteria each form simplified configurations of the ANN on predictions for the performance of the ANN in the particular configuration. These two assessment criteria are at least partially complementary to one another. This means that they assess different aspects of the configuration of the ANN and do not only assess the same aspect in different ways.

This is somewhat similar to it not providing any fundamentally new increase in knowledge to remeasure, using a laser measuring device, the dimensions of an object previously measured using a measuring tape, while additionally weighing the object already permits a determination of the density and thus narrowing down of the material.

Accordingly, the same simplified configuration of the ANN of the two assessment criteria different predictions will be obtained for the performance of the ANN on different scales.

In accordance with an example embodiment of the present invention, the simplified configuration of the ANN is now optimized with the goal that this simplified configuration is mapped

- both by the first assessment criterion and by the second assessment criterion, and/or
- by an overall assessment criterion originating from a combination of both assessment criteria, on the best possible prediction for the performance of the ANN in this simplified configuration.

The useful applications of an optimized simplified configuration of the ANN are manifold. If the simplification takes place, for example, even before the training of the ANN or during the training, the demand for computing time and memory space for the ANN may be significantly reduced. At the same time, the complexity of the ANN is also significantly reduced. This in turn has the result that the behavior of the ANN generalizes better to data unseen in the training. The tendency of the ANN called "overfitting" is thus suppressed, to more or less "learn by rote" the training data instead of developing a real "comprehension" of the training data. As a result, the performance of the ANN in the predefined application, such as image classification, is improved in a greater bandwidth of situations.

However, the simplified configuration may also be ascertained for an ANN which is already completely trained. In this way, for example, an ANN trained with great effort may be optimized for specific applications, in which it is to be loaded in the shortest possible time via a network or, for example, implemented on an embedded system including restricted hardware resources.

It has been recognized that using two at least partially complementary assessment criteria has the result that an ANN simplified in a certain predefined degree (thus, for example, using a predefined number of parameters set to zero) displays better performance in the training or in the real application. Thus, for example, in the case of an ANN used as an image classifier, the accuracy increases with which test images unseen during the training are mapped on setpoint assignments previously known for these test images for one or multiple classes. Using two or more assessment criteria, a more complete image thus results as to which parameters or which neurons or other processing units are actually indispensable for the performance of the ANN in the particular application.

In one particularly advantageous embodiment of the present invention, the first assessment criterion and the second assessment criterion are selected in such a way that

- a first optimal pruning parameter set, which results according to the first assessment criterion in an optimal prediction for the performance of the simplified ANN, is not congruent with a second optimal pruning parameter set, which results according to the second assessment criterion in an optimal prediction for the performance of the simplified ANN; and/or a first optimal pruning unit set, which results according to the first assessment criterion in an optimal prediction for the performance of the simplified ANN, is not congruent with a second optimal pruning unit set, which results according to the second assessment criterion in an optimal prediction for the performance of the simplified ANN.

It is reflected herein that both assessment criteria assess sufficiently different aspects of the simplified configuration of the ANN and are thus at least partially complementary to one another.

The first assessment criterion and the second assessment criterion are particularly advantageously selected in such a way that the first optimal pruning parameter set and the second optimal pruning parameter set or the first optimal pruning unit set and the second optimal pruning unit set have at most 75%, preferably at most 40%, of their elements in common. In experiments of the inventors, it has been shown that the two assessment criteria then mutually supplement one another to a particular extent in the described manner.

In one particularly advantageous embodiment of the present invention, the first assessment criterion contains an assessment averaged over various parameters or over various neurons or other processing units. At the same time, the second assessment criterion assesses the effect of a change of the configuration with respect to individual parameters or with respect to individual neurons or other processing units. These two goals are equally important and also somewhat contradictory.

It is thus desirable, for example, that neurons or other processing units which, taken as such, only contribute very little to the performance of the ANN, are saved in the simplified configuration of the ANN. However, if this takes place with many neurons or other processing units which form a contiguous line, partial areas of the ANN may be cut off from the information flow or the information flow through the ANN may even be completely interrupted, so that it is no longer usable. It is therefore advantageous if one of the assessment criteria in some form measures the functionality of the ANN as a whole in the simplified configuration.

Such a summary assessment criterion may, for example, advantageously better assess a simplified configuration of the ANN the greater an average gradient flow through the ANN is. This gradient flow is a measure of the information flow through the ANN, in particular in the case of the back propagation of errors during the training. The gradient flow may be ascertained, for example, as an average gradient norm over all parameters which are not set to zero or set or fixed at a constant value in the simplified configuration of the ANN. The average may be formed, for example, over a batch of training data and ascertained during the processing of such a batch by the ANN. This assessment criterion is also called "GraSP" (from "Gradient Signal Preservation").

In contrast, an assessment criterion may, for example, advantageously better assess the adding of a further parameter to the pruning parameter set, and/or the adding of a further neuron or a further processing unit to the pruning unit set the lower the influence of this change on the trainability of the ANN is. For example, an attempt may be made to save all parameters, neurons, or processing units, whose influence is below a predefined threshold value. The influence of a parameter may be ascertained, for example, as an absolute value product of this parameter with its gradient.

In this way, for example, like a "greedy algorithm" in the ANN, always that parameter or that neuron or that processing unit having the present least influence on the trainability of the ANN may be saved. This assessment criterion is also called "SNIP" (from "Single-Shot Network Pruning based on Connection Sensitivity").

In another advantageous embodiment of the present invention, the two assessment criteria use different portions of the setpoint information contained in a training data set, on which the ANN is to map the training data of this training data set. In this way, for example, one of the assessment criteria may be given a more or less "unmonitored" character. If the ANN is used, for example, as an image classifier, one or both assessment criteria may each use the setpoint information with respect to assignments of images to different subsets of the available classes. Setpoint information (classification scores) with respect to other classes may each be replaced, for example, by samples drawn from a random distribution. In this way, the assessment criterion may measure how well the ANN is managing with applications in which only a small part of the available training data is "labeled" using setpoint information.

In another particularly advantageous embodiment of the present invention, the simplified configuration is optimized alternately with regard to the first assessment criterion and with regard to the second assessment criterion. As explained above, the two assessment criteria in many cases may not only be at least partially complementary, but be also at least partially contrary. The two assessment criteria may then oppose one another in the training similarly to generator and discriminator of a Generative Adversarial Network, GAN.

In another advantageous embodiment of the present invention, an optimization is carried out with regard to an overall assessment criterion resulting from the first assessment criterion and the second assessment criterion under the secondary condition of an additional restriction for one of the assessment criteria which is incorporated in the overall assessment criterion. In this way, the tendency may be suppressed that a possibly numerically unstable assessment criterion, which is actually to be optimized in cooperation with the other assessment criterion, assumes exorbitant values and in this way results in simplified configurations in which the other assessment criterion actually no longer plays a role. One example of a numerically unstable assessment criterion is the above-mentioned SNIP, which studies the effect of the "pruning" of a further parameter or a further neuron or another processing unit.

The relative weighting of the assessment criteria in relation to one another may be set via the limiting value which is used for the restriction of one of the assessment criteria. This limiting value is thus a hyperparameter having immediately apparent importance, which facilitates its optimization.

In another advantageous embodiment of the present invention, the optimization includes transforming the optimization task into a convex problem and solving this convex problem with the aid of convex optimization. In this convex optimization, the secondary condition to be taken into consideration is converted into an optimization task with respect to a Lagrange multiplier, which is also referred to as a "dual problem" to the original optimization task. This problem may be solved, for example, by interval nesting. An optimal solution for the simplified configuration of the ANN is also specified by the optimal solution for the Lagrange multiplier. The simplified configuration may be provided in this context, for example, as a binary mask, which indicates whether each parameter or each neuron or each other processing unit is still active in the simplified configuration or is saved.

An ANN which is designed as an image classifier is particularly advantageously selected. Such an image classifier maps an input image on an assignment to one or multiple classes of a predefined classification. In particular an ANN used as an image classifier may often be simplified very strongly without the accuracy of the classification suffering to a relevant extent.

As explained above, the simplification of the ANN may in particular be carried out, for example, before the training of the ANN. The present invention therefore also relates to a method in which initially an ANN is provided and then a simplified configuration is ascertained for this ANN as described above. After the ANN has been brought into this simplified configuration, it is trained. After completion of the training, the ANN is ready for use for the provided application.

As explained above, however, an ANN which is already completely trained may also be subsequently simplified. The present invention therefore also relates to a further method. In this further method, a trained ANN is provided. The simplified configuration for this ANN is ascertained using the above-described method. The ANN is then transformed into this simplified configuration, so that it is ready for use for the provided application. The ANN may optionally also be subjected to a "fine-tuning" step on the basis of the training data after the transformation into the simplified configuration. This "fine-tuning" may include, for example, further training steps on the basis of the training data. Using these further training steps, for example, the accuracy achieved by the ANN on the training data may be optimized, which may be ascertained from deviations of the outputs supplied by the ANN from "labels" (also called "ground truth") associated with the training data. Alternatively or also in combination therewith, it is also possible to optimize for other goals, for example, the best possible "intersection over union." The "fine-tuning" is to counteract the change of the ANN due to setting many parameters to zero.

Measurement data, which were recorded using at least one sensor, are advantageously supplied to the ready-to-use ANN. The measurement data may in particular be, for example, image data, video data, radar data, LIDAR data, or ultrasonic data.

The measurement data are mapped by the ANN on outputs. An activation signal is generated from the outputs thus obtained. Using this activation signal, a vehicle, an object recognition system, a system for quality control of products, and/or a system for medical imaging is activated.

The simplification of the configuration of the ANN causes the ANN to be able to be made capable faster of generating reasonable outputs from measurement data, so that ultimately activation signals are generated, to which the particular activated technical system reacts in a way suitable for the sensorially detected situation. As explained above, computing effort is saved within the scope of the training, so that the training runs faster as a whole. Furthermore, the completely trained ANN may be transported faster from the entity which has trained it to the entity which operates the technical system to be activated and requires the outputs of the ANN for this purpose. The required memory space of this processing entity is reduced, i.e., the ANN may be evaluated on hardware having less memory space.

The above-described methods may in particular be computer implemented, for example, and thus may be represented in software. The present invention therefore also relates to a computer program including machine-readable instructions which, when they are executed on one or multiple computer(s), prompt the computer or computers to carry out one of the described methods. In this meaning, controllers for vehicles and embedded systems for technical devices which are also capable of executing machine-readable instructions are also to be considered computers.

The present invention also relates to a machine-readable data medium and/or a download product including the computer program. A download product is a digital product transferable via a data network, i.e., downloadable by a user of the data network, which may be offered for sale, for example, in an online shop for immediate download.

Furthermore, a computer may be equipped with the computer program, the machine-readable data medium, or the download product.

Further measures improving the present invention are described in greater detail hereinafter together with the description of the preferred exemplary embodiments of the present invention on the basis of figures.

DETAILED DESCRIPTION OF EXAMPLE EMBODIMENTS

Figure 1:
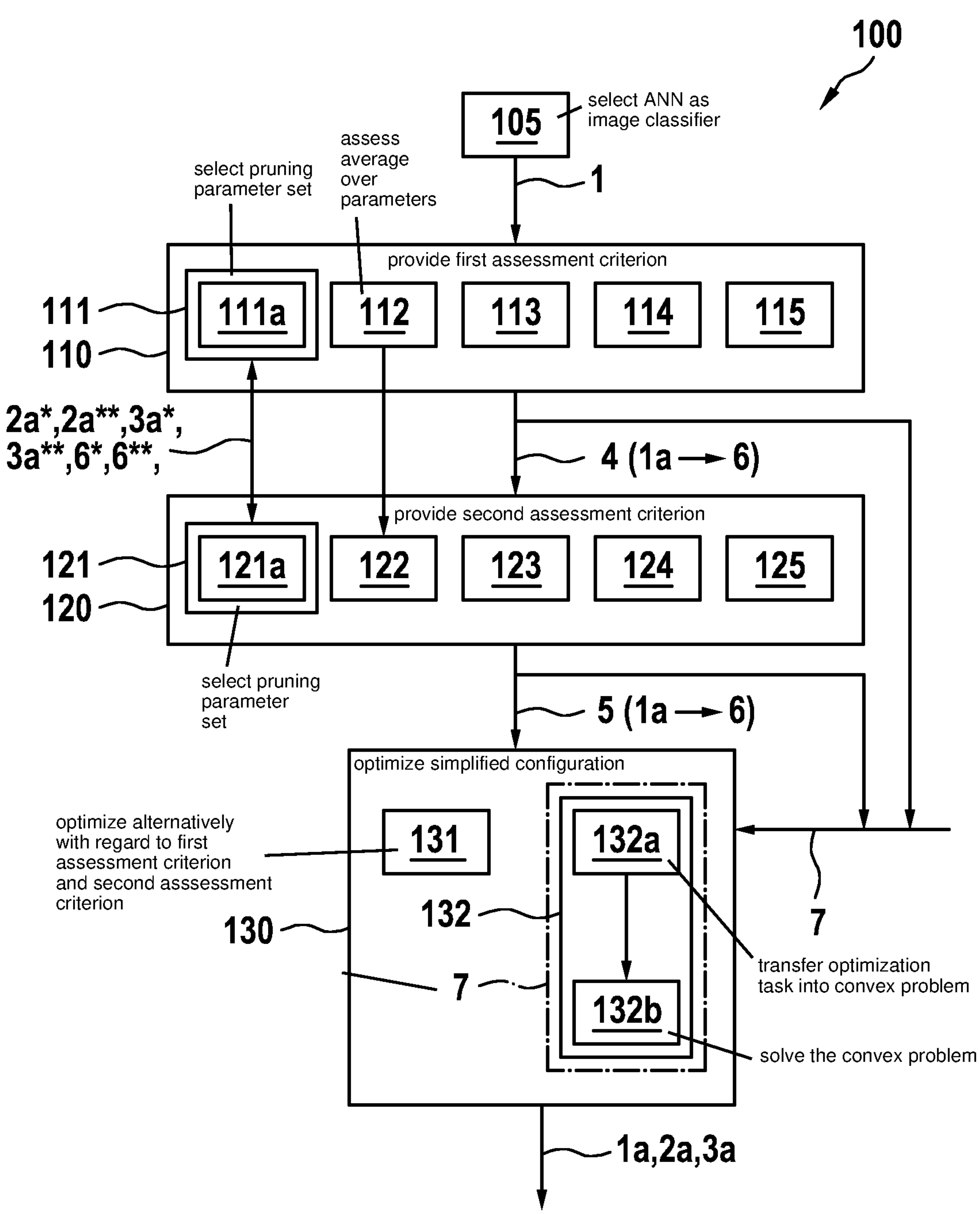
FIG. 1 shows an exemplary embodiment of method 100 for simplifying an ANN 1, according to the present invention.

FIG. 1 is a schematic flowchart of an exemplary embodiment of method 100 for simplifying an ANN 1. In step 105, an ANN designed as an image classifier is selected.

In step 110, a first assessment criterion 4 is provided. In step 120, a second assessment criterion 5 is provided. Both assessment criteria 4, 5 map simplified configurations 1*a* of ANN 1 on predictions 6 of the performance of ANN 1 in particular configuration 1*a*. The two assessment criteria 4, 5 are at least partially complementary to one another.

According to block 111, 121, the two assessment criteria 4, 5 may in particular be selected in such a way that pruning parameter sets 2*a and 2*a* ascertained according to these criteria 4 and 5 and/or pruning unit sets 3*a and 3*a* ascertained according to these criteria 4 and 5, which each result in optimal predictions 6* and 6 for the performance of simplified ANN 1, are not congruent. According to block 111***a*, 121*a*, pruning parameter sets 2*a and 2*a* or pruning unit sets 3*a and 3*a* share at most 75%, preferably at most 40%, of their elements.

According to block 112, first assessment criterion 4 may include an assessment averaged over various parameters 2 or over various neurons or other processing units 3. Second assessment criterion 5 may then assess, according to block 122, the effect of a change of configuration 1*a* with respect to individual parameters 2 or with respect to individual neurons or other processing units 3.

According to block 113, 123, an assessment criterion 4, 5 may better assess a simplified configuration 1*a* of ANN 1 the greater an average gradient flow through ANN 1 is.

According to block 114, 124, an assessment criterion 4, 5 may better assess the addition of a further parameter 2 to pruning parameter set 2*a*, and/or the addition of a further neuron or a further processing unit 3 to pruning unit set 3*a* the less the influence of this change is on the trainability of ANN 1.

According to block 115, 125, the two assessment criteria 4, 5 may use different portions of the setpoint information contained in a training data set, on which ANN 1 is ideally to map the training data of this training data set.

In step 130, a simplified configuration 1*a* of ANN 1 is optimized with the goal that this simplified configuration 1*a* is to be mapped both by first assessment criterion 4 and also by second assessment criterion 5, and/or by an overall assessment criterion 7 resulting from a combination of both assessment criteria 4, 5, on a best possible prediction 6 for the performance of ANN 1.

For this purpose, for example, simplified configuration 1*a* may in particular be optimized alternately with regard to first assessment criterion 4 and with regard to second assessment criterion 5 (block 131).

According to block 132, for example, an optimization may be carried out with regard to an overall assessment criterion 7 with the secondary condition of an additional restriction for one of assessment criteria 4, 5, which are incorporated in overall assessment criterion 7.

This may include in particular, for example, according to block 132*a*, transforming the optimization task into a convex problem and, according to block 132*b*, solving this convex problem with the aid of convex optimization.

The final result of optimization 130 is a simplified configuration 1*a* of ANN 1, which is characterized by an optimized pruning parameter set 2*a* and/or by an optimized pruning unit set 3*a*.

Figure 2:
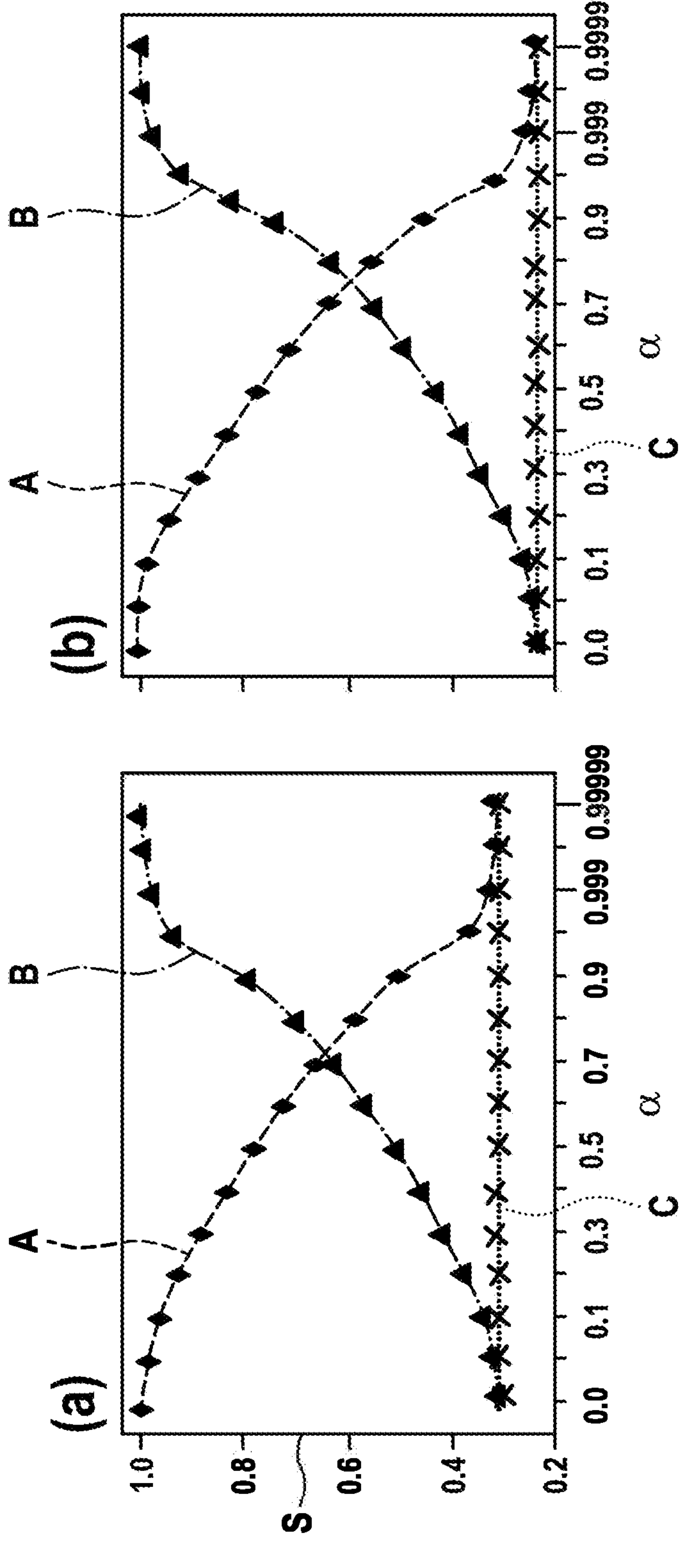
FIG. 2 shows similarities S of pruning parameter set 2*a* to optimal pruning parameter sets 2*a (curve A), 2*a* (curve B) according to assessment criteria 4, 5; similarity S of pruning parameter sets 2*a, 2*a* (curve C).

FIG. 2 shows by way of example how assessment criteria 4, 5 may be continuously weighted in relation to one another using a parameter a. In each case similarities S of pruning parameter sets are plotted, which were ascertained using a Hamming distance. Partial image (a) was created for a component of 90% pruned parameters 2 and partial image (b) for a component of 99.5% pruned parameters 2.

Curve A describes similarity S of pruning parameter set 2*a* ultimately ascertained using method 100 according to FIG. 1 to optimal pruning parameter set 2*a ascertained solely according to first assessment criterion 4. Curve B describes similarity S of pruning parameter set 2***a* to optimal pruning parameter set 2*a* ascertained solely according to the second assessment criterion. Curve C describes similarity S of optimal pruning parameter sets 2*a and 2*a***.

Parameter a determines, in the optimization mentioned in conjunction with FIG. 1 to an overall assessment criterion 7, the additional restriction for one of assessment criteria 4, 5, which are incorporated in overall assessment criterion 7.

Figure 3:
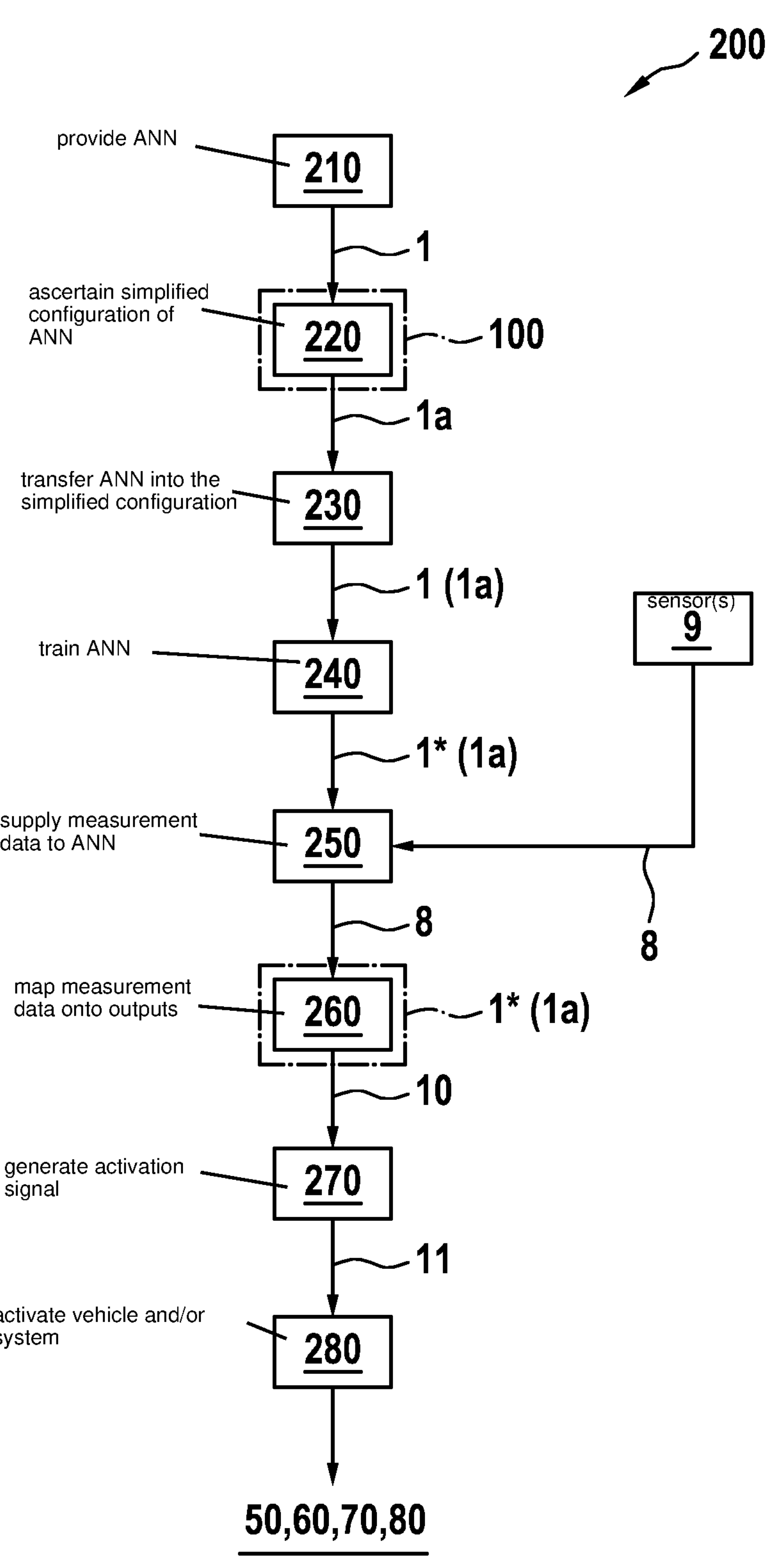
FIG. 3 shows an exemplary embodiment of method 200 including simplification of ANN 1 prior to the training, according to the present invention.

FIG. 3 is a schematic flowchart of an exemplary embodiment of method 200, in the context of which an ANN 1 is simplified prior to the training.

In step 210, ANN 1 is provided. In step 220, using above-described method 100, a simplified configuration 1*a* of ANN 1 is ascertained. In step 230, ANN 1 is transformed into this simplified configuration 1*a*. Subsequently, ANN 1(1*a*) obtained in this case is trained (step 240). A completely trained ANN 1*(1*a*) in simplified configuration 1*a* results.

In step 250, measurement data 8 are supplied to this ANN 1*(1*a*), which were recorded using at least one sensor 9. These measurement data 8 are mapped in step 260 by ANN 1*(1*a*) on outputs 10. In step 270, an activation signal 11 is generated from these outputs 10. In step 280, a vehicle 50, an object recognition system 60, a system 70 for quality control products, and/or a system 80 for medical imaging is activated using activation signal 11.

Figure 4:
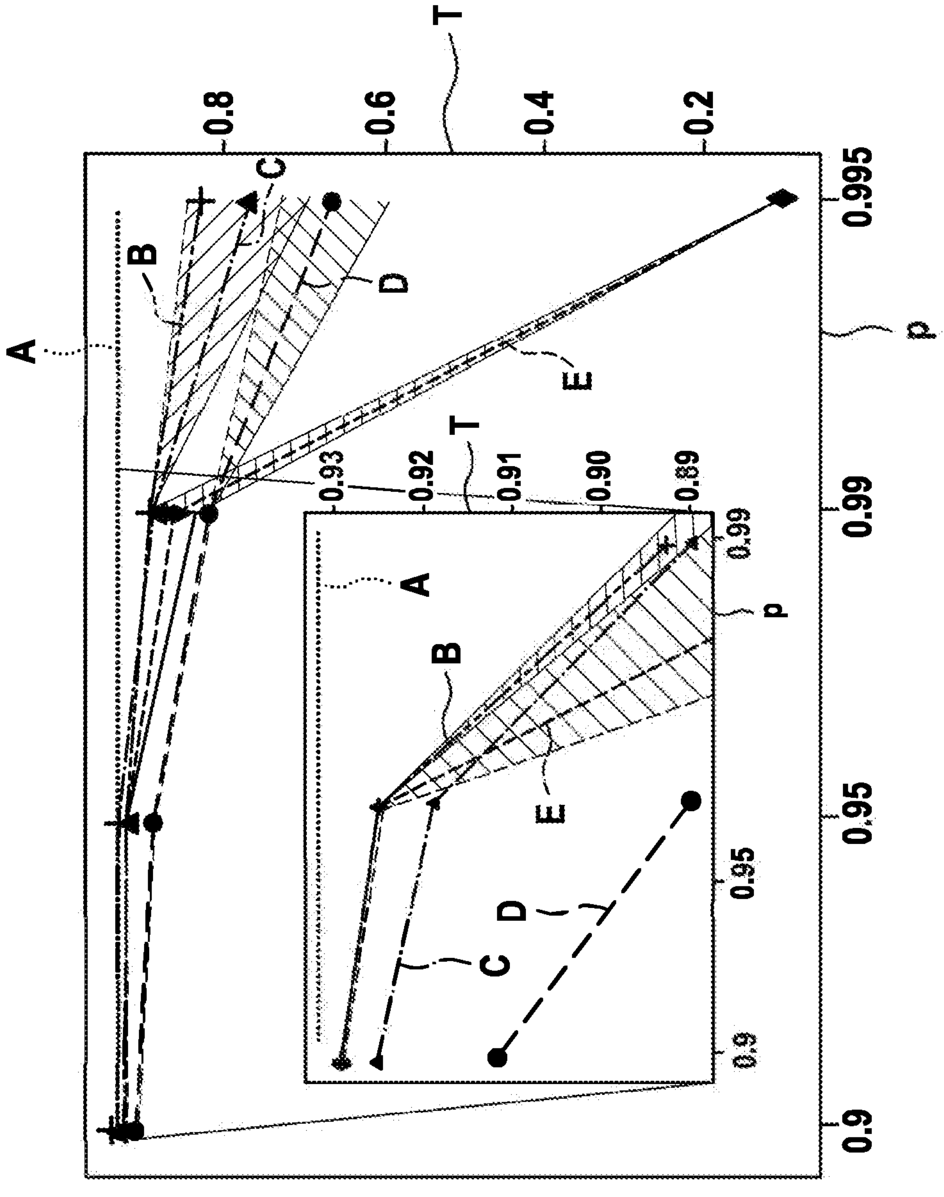
FIG. 4 shows a comparison of the performance of completely trained ANN 1* (curve B) obtained according to FIG. 3 to the performance of an unpruned ANN (curve A) and the performances of ANNs (curves C-E) pruned in other ways.

FIG. 4 illustrates the performance which an ANN 1*(1*a*) of architecture VGG16 trained after the simplification achieves in comparison to an ANN trained in other ways on standard data set CIFAR-10. Test accuracy T is plotted in each case, using which test data of data set CIFAR-10 are classified after the ANN was trained using the training data of this data set. This test accuracy T is represented as a function of portion p of pruned parameters 2 on a scale from 0 (≙0%) to 1 (≙100%).

Curve A is the reference for an unpruned ANN. Curve B shows the performance of ANN 1*(1*a*) trained according to FIG. 3. Curve C shows the performance of an ANN only pruned on the basis of the GraSP criterion. Curve D shows the performance of an ANN, whose parameters to be pruned were selected randomly. Curve E shows the performance of an ANN pruned on the basis of the SNIP criterion.

Figure 5:
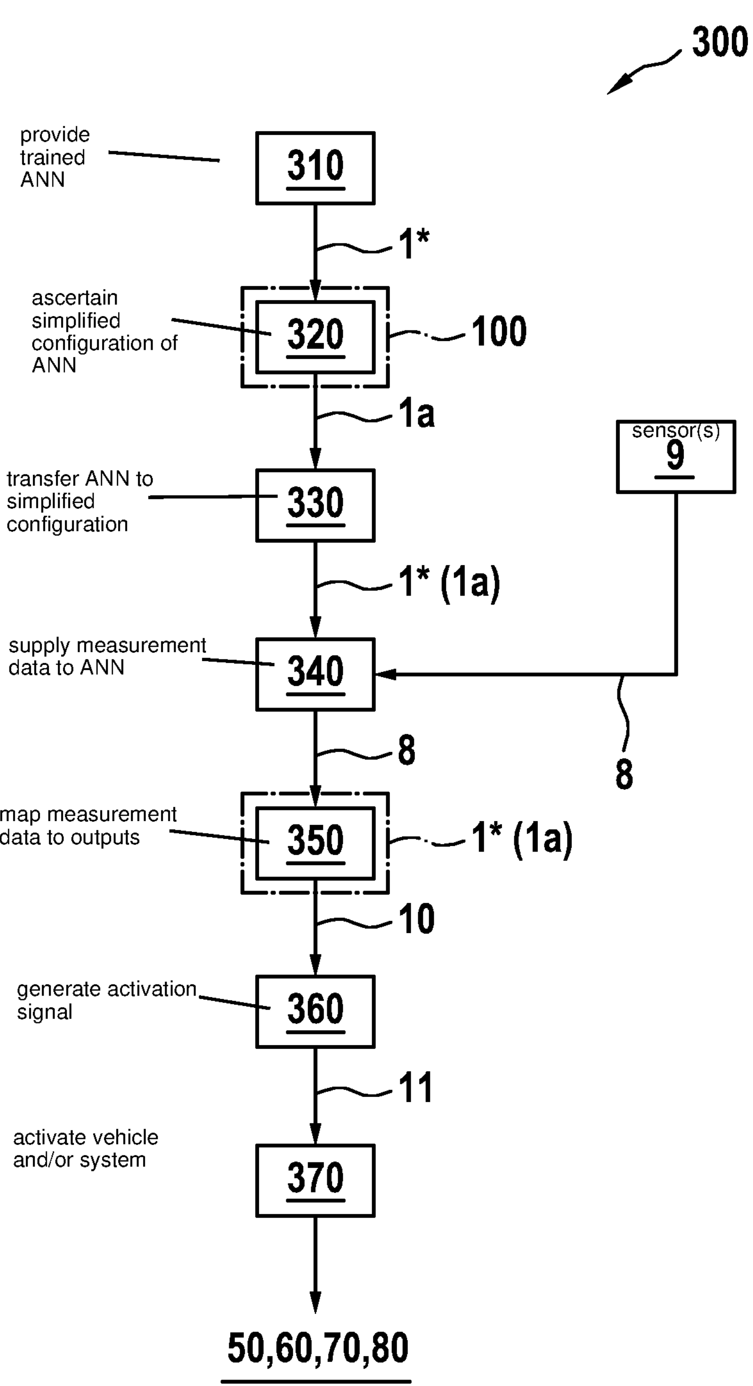
FIG. 5 shows an exemplary embodiment of method 300 including simplification of ANN 1 after the training, according to the present invention.

FIG. 5 is a schematic flowchart of an exemplary embodiment of method 1, in which ANN 1 is first simplified after the training.

In step 310, a trained ANN 1* is provided. In step 320, a simplified configuration 1*a* for ANN 1* is ascertained using above-described method 100. ANN 1* is transformed in step 330 into this simplified configuration 1*a*. A completely trained and also simplified ANN 1*(1*a*) results. This ANN 1*(1*a*) may optionally be subjected after the transformation into simplified configuration 1*a* to a "fine tuning" step on the basis of the training data. This "fine tuning" may, for example, include further training steps on the basis of the training data.

In step 340, measurement data 8 are supplied to this ANN 1*(1*a*), which were recorded using at least one sensor 9. These measurement data 8 are mapped in step 350 by ANN 1*(1*a*) on outputs 10. In step 360, an activation signal 11 is generated from these outputs 10. In step 370, a vehicle 50, an object recognition system 60, a system 70 for quality control products, and/or a system 80 for medical imaging is activated using activation signal 11.

The invention claimed is:

1. A method for simplifying an artificial neural network (ANN), whose behavior is characterized by trainable parameters, the method comprising the following steps:

providing a first assessment criterion, which maps simplified configurations of the ANN on predictions for a performance of the ANN in the configurations, each simplified configuration of the ANN differing from an original configuration of the ANN in that:

parameters from a pruning parameter set, which is a proper subset of the trainable parameters, are: (i) each set to zero or a constant value and/or (ii) fixed during the training of the ANN, and/or neurons or other processing units from a pruning unit set, which is a proper subset of the neurons or other processing units of the ANN, are deactivated;

providing a second assessment criterion, which also maps the simplified configurations of the ANN on predictions for the performance of the ANN in the configurations, the second assessment criterion being at least partially complementary to the first assessment criterion;

optimizing a simplified configuration of the ANN with a goal that the simplified configuration is mapped on the best possible prediction for the performance of the ANN:

both by the first assessment criterion and also by the second assessment criterion, and/or by an overall assessment criterion resulting from a combination of the first assessment criterion and the second assessment criterion.

2. The method as recited in claim 1, wherein the first assessment criterion and the second assessment criterion are selected in such a way that:

a first optimal pruning parameter set, which according to the first assessment criterion results in an optimal prediction for the performance of the simplified ANN, is not congruent with a second optimal pruning parameter set, which according to the second assessment criterion results in an optimal prediction for the performance of the simplified ANN; and/or a first optimal pruning unit set, which according to the first assessment criterion results in an optimal prediction for the performance of the simplified ANN, is not congruent with a second optimal pruning unit set, which according to the second assessment criterion results in an optimal prediction for the performance of the simplified ANN.

3. The method as recited in claim 2, wherein the first assessment criterion and the second assessment criterion are selected in such a way that: (i) the first optimal pruning parameter set and the second optimal pruning parameter set, or (ii) the first optimal pruning unit set and the second optimal pruning unit set, have at most 75% of their elements in common.

4. The method as recited in claim 2, wherein the first assessment criterion and the second assessment criterion are selected in such a way that: (i) the first optimal pruning parameter set and the second optimal pruning parameter set, or (ii) the first optimal pruning unit set and the second optimal pruning unit set, have at most 40% of their elements in common.

5. The method as recited in claim 1, wherein:

the first assessment criterion includes an assessment averaged over various parameters or over various neurons or other processing units, and the second assessment criterion assesses an effect of a change of a configuration with respect to individual parameters or with respect to individual neurons or other processing units.

6. The method as recited in claim 1, wherein the first and/or second assessment criterion better assesses a simplified configuration of the ANN the greater an average gradient flow through the ANN is.

7. The method as recited in claim 1, wherein the first and/or second assessment criterion better assesses: (i) an addition of a further parameter set to the pruning parameter set, and/or (ii) an addition of a further neuron or a further processing unit to the pruning unit set, the less an influence of the addition on a trainability of the ANN is.

8. The method as recited in claim 1, wherein the first and second assessment criteria use different portions of setpoint information contained in a training data set, on which the ANN is ideally to map the training data of the training data set.

9. The method as recited in claim 1, wherein the simplified configuration is optimized alternately with regard to the first assessment criterion and with regard to the second assessment criterion.

10. The method as recited in claim 1, wherein an optimization is carried out with regard to an overall assessment criteria under a secondary condition of an additional restriction for one of the first and second assessment criteria, which are incorporated in the overall assessment criterion.

11. The method as recited in claim 10, wherein the optimization includes: transforming an optimization task into a convex problem, and solving the convex problem using convex optimization.

12. The method as recited in claim 1, wherein the ANN is an image classifier which maps an input image on an assignment to one or multiple classes of a predefined classification.

13. A method, comprising the following steps:

providing an artificial neural network (ANN);

ascertaining a simplified configuration of the ANN by:

providing a first assessment criterion, which maps simplified configurations of the ANN on predictions for a performance of the ANN in the configurations, each simplified configuration of the ANN differing from an original configuration of the ANN in that:

parameters from a pruning parameter set, which is a proper subset of the trainable parameters, are: (i) each set to zero or a constant value and/or (ii) fixed during the training of the ANN, and/or neurons or other processing units from a pruning unit set, which is a proper subset of the neurons or other processing units of the ANN, are deactivated;

providing a second assessment criterion, which also maps the simplified configurations of the ANN on predictions for the performance of the ANN in the configurations, the second assessment criterion being at least partially complementary to the first assessment criterion;

optimizing a simplified configuration of the ANN with a goal that the simplified configuration is mapped on the best possible prediction for the performance of the ANN:

both by the first assessment criterion and also by the second assessment criterion, and/or by an overall assessment criterion resulting from a combination of the first assessment criterion and the second assessment criterion;

transforming the ANN into the simplified configuration and subsequently training the ANN.

14. A method, comprising the following steps:

providing a trained artificial neural network (ANN);

ascertaining a simplified configuration of the ANN by:

providing a first assessment criterion, which maps simplified configurations of the ANN on predictions for a performance of the ANN in the configurations, each simplified configuration of the ANN differing from an original configuration of the ANN in that:

parameters from a pruning parameter set, which is a proper subset of the trainable parameters, are: (i) each set to zero or a constant value and/or (ii) fixed during the training of the ANN, and/or neurons or other processing units from a pruning unit set, which is a proper subset of the neurons or other processing units of the ANN, are deactivated;

providing a second assessment criterion, which also maps the simplified configurations of the ANN on predictions for the performance of the ANN in the configurations, the second assessment criterion being at least partially complementary to the first assessment criterion;

optimizing a simplified configuration of the ANN with a goal that the simplified configuration is mapped on the best possible prediction for the performance of the ANN:

both by the first assessment criterion and also by the second assessment criterion, and/or by an overall assessment criterion resulting from a combination of the first assessment criterion and the second assessment criterion; and transforming the ANN into the simplified configuration.

15. The method as recited in claim 13, further comprising:

supplying measurement data to the ANN, which were recorded using at least one sensor;

mapping, by the ANN, the measurement data on outputs;

generating an activation signal from the outputs; and activating, using the activation signal, a vehicle and/or an object recognition system and/or a system for quality control of products and/or a system.

16. The method as recited in claim 14, further comprising:

supplying measurement data to the ANN, which were recorded using at least one sensor;

mapping, by the ANN, the measurement data on outputs;

generating an activation signal from the outputs; and activating, using the activation signal, a vehicle and/or an object recognition system and/or a system for quality control of products and/or a system.

17. A non-transitory machine-readable data medium on which is stored a computer program for simplifying an artificial neural network (ANN), whose behavior is characterized by trainable parameters, the computer program, when executed by a computer, causing the computer to perform the following steps:

providing a first assessment criterion, which maps simplified configurations of the ANN on predictions for a performance of the ANN in the configurations, each simplified configuration of the ANN differing from an original configuration of the ANN in that:

parameters from a pruning parameter set, which is a proper subset of the trainable parameters, are: (i) each set to zero or a constant value and/or (ii) fixed during the training of the ANN, and/or neurons or other processing units from a pruning unit set, which is a proper subset of the neurons or other processing units of the ANN, are deactivated;

providing a second assessment criterion, which also maps the simplified configurations of the ANN on predictions for the performance of the ANN in the configurations, the second assessment criterion being at least partially complementary to the first assessment criterion;

optimizing a simplified configuration of the ANN with a goal that the simplified configuration is mapped on the best possible prediction for the performance of the ANN:

both by the first assessment criterion and also by the second assessment criterion, and/or by an overall assessment criterion resulting from a combination of the first assessment criterion and the second assessment criterion.

18. A computer configured to simplify an artificial neural network (ANN), whose behavior is characterized by trainable parameters, the computer configured to:

provide a first assessment criterion, which maps simplified configurations of the ANN on predictions for a performance of the ANN in the configurations, each simplified configuration of the ANN differing from an original configuration of the ANN in that:

parameters from a pruning parameter set, which is a proper subset of the trainable parameters, are: (i) each set to zero or a constant value and/or (ii) fixed during the training of the ANN, and/or neurons or other processing units from a pruning unit set, which is a proper subset of the neurons or other processing units of the ANN, are deactivated;

provide a second assessment criterion, which also maps the simplified configurations of the ANN on predictions for the performance of the ANN in the configurations, the second assessment criterion being at least partially complementary to the first assessment criterion;

optimize a simplified configuration of the ANN with a goal that the simplified configuration is mapped on the best possible prediction for the performance of the ANN:

both by the first assessment criterion and also by the second assessment criterion, and/or by an overall assessment criterion resulting from a combination of the first assessment criterion and the second assessment criterion.

* * * * *